United States Patent [19]
Brown

[11] 3,747,772
[45] July 24, 1973

[54] FILTER
[75] Inventor: Carl Brown, Birmingham, Mich.
[73] Assignee: Parker-Hannifin Corporation, Cleveland, Ohio
[22] Filed: May 21, 1971
[21] Appl. No.: 145,628

[52] U.S. Cl................. 210/493, 210/495, 55/489, 55/501, 55/502, 55/521, 55/DIG. 31
[51] Int. Cl............................................ B01d 27/06
[58] Field of Search.............. 55/DIG. 31, 501, 55/502, 511, 521, 489; 210/493, 495

[56] References Cited
UNITED STATES PATENTS
3,389,031  6/1968  Rosaen et al.................. 210/493 X
3,395,208  7/1968  Witchell........................... 55/502

FOREIGN PATENTS OR APPLICATIONS
781,194   8/1957   Great Britain..................... 210/495
581,793   10/1946  Great Britain..................... 210/495

Primary Examiner—Samih N. Zaharna
Assistant Examiner—F. F. Calvetti
Attorney—John N. Wolfram

[57] ABSTRACT

A filter for fluids in which a generally planar pleated filter element of fine mesh wire cloth or the like and a generally planar perforated plate for supporting the pleated element have their marginal portions embedded within a perimetric frame of resilient material.

2 Claims, 5 Drawing Figures

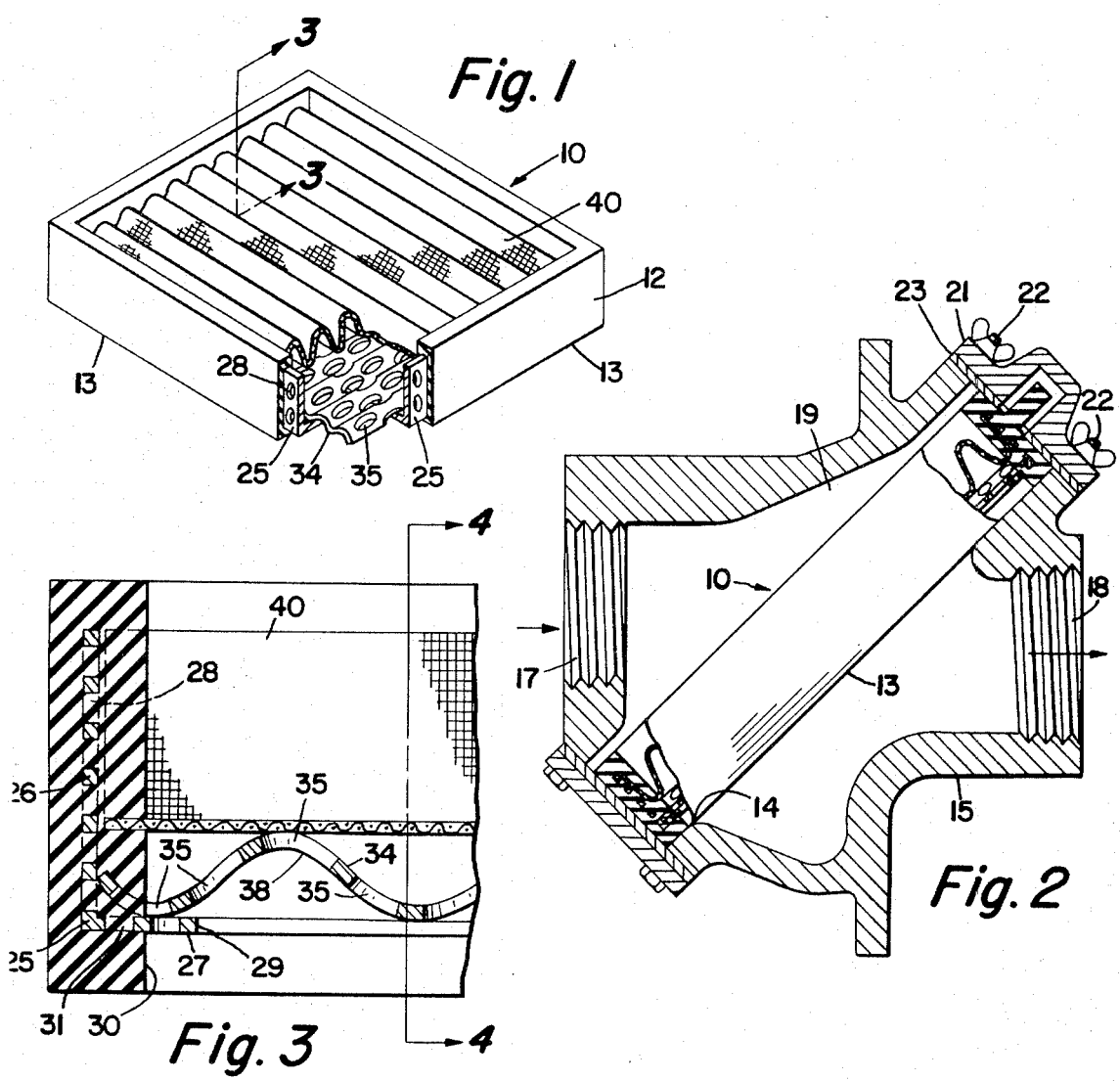
Fig. 1
Fig. 2
Fig. 3
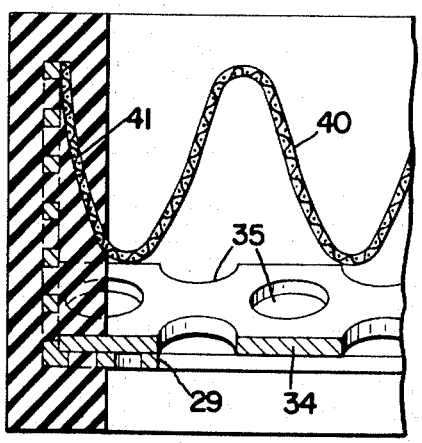
Fig. 4
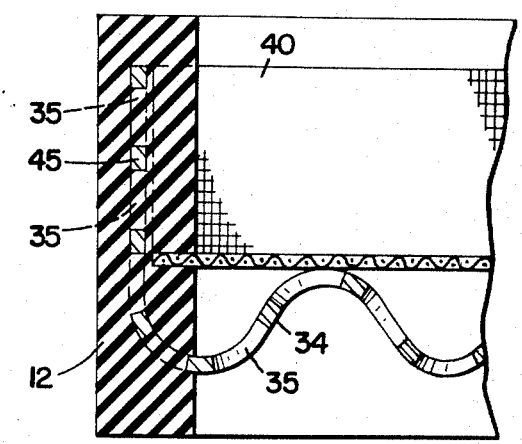
Fig. 5

3,747,772

FILTER

BACKGROUND OF THE INVENTION

This invention relates generally to filters of the general type shown in U.S. Letters Pat. No. 3,471,023 for hydraulic or other fluid systems and that utilize a pleated filter element of fine mesh wire cloth or the like carried in a filter frame and extending across the flow path to prevent entrance of foreign matter into the system. Such pleated elements must be supported across the flow path within the frame to prevent the passing therethrough of unfiltered fluid and to prevent undue distortion and strain upon the pleated element by differential fluid pressure thereacross.

Heretofore it has been difficult to obtain an adequate seal at the margins of the pleated element and to provide proper support and attachment to the frame.

SUMMARY OF THE INVENTION

The present invention overcomes the above difficulties by providing a frame of resilient material into which all the marginal portions of the pleated filter element and of a perforated plate for supporting the element are sealingly embedded. The marginal portions of the element and support plate have perforations and the resilient material is molded onto the margins so that the resilient material extends through the perforations for firmly locking the pleated element and support plate thereto. Also, an additional supporting member may be included that has a perforated axially extending portion embedded and locked within the resilient frame and having a narrow transverse portion for firmly supporting the plate and pleated element.

DETAIL DESCRIPTION

FIG. 1 is a perspective view, partly cutway, showing the filter.

FIG. 2 is a cross section view of a filter housing showing the filter mounted therein.

FIG. 3 is an enlarged fragmentary section view along the lines 3—3 of FIG. 1.

FIG. 4 is an enlarged fragmentary section view along the lines 4—4 of FIG. 3.

FIG. 5 is an enlarged fragmentary cross section view corresponding to FIG. 3 but showing a modified form of the invention.

The filter 10 shown in FIG. 1 includes a generally rectangular frame 12 of resilient material whose bottom edges 13 lie substantially in a flat plane for seating against a continuous planar surface 14 formed in filter housing 15 shown in FIG. 2. The housing has a fluid inlet port 17 and an outlet port 18, both connected to a chamber 19 in which filter 10 is mounted. Housing 15 has a cover 21 attached thereto by means of bolts 22 and a gasket 23 seals the connection between the housing and cover. Removal of cover 21 permits insertion and removal of filter 10 from the housing.

In the preferred form of the invention shown in FIGS. 1-4, frame 12, which is made of molded resilient material, such as polyurethane, synthetic rubber, or other elastomeric material, has embedded therein a support member 25 of L-shaped cross section that includes an axially extending portion 26 and a transversely extending portion 27 and which extends throughout all four sides of the resilient frame 12. Axially extending portion 26 has a series of perforations 28 therethrough through which elastomeric material extends to lock member 26 in position.

The transverse portion 27 of support member 25 has a rectangular opening 29 therethrough that is axially aligned with opening 30 through resilient frame 12 and it also has a series of small openings 31 therethrough for receiving resilient material of frame 12.

Mounted adjacent transverse portion 27 of member 25 for axial support thereby is a perforated plate 34 having a plurality of relatively large perforations 35 therethrough and having pleats or corrugations 38 that extend in one transverse direction across frame 12. The four marginal portions of plate 34 are axially supported by transverse portion 27 of member 25 and extend into the four sides of resilient frame 12 substantially into contact with the four sides 26 of member 25. Some of the perforations 35 extend into resilient frame 12 and the resilient material passes therethrough. The resilient material thus anchors and seals the marginal portions of plate 34.

Adjacent plate 34 is a pleated filter element 40 of fine mesh wire cloth. The pleats are relatively deep so as to provide a large filtering surface and they run in a direction at right angles to the direction of the pleats in plate 34. As illustrated in FIGS. 3 and 4, all four marginal portions of filter element 40 extend into the resilient frame to be sealed thereby and to be anchored therein, resilient material passing through the interstices of the wire mesh for facilitating such anchoring.

Axial portion 26 of support member 25 extends upwardly, as viewed in FIGS. 3 and 4, substantially the same distance as the pleats of element 40 to impart rigidity to the resilient frame 12 throughout the axial extent of the pleats so that the resilient frame 12 cannot be distorted in a manner to separate the same from the pleats or from plate 34 whereby the seal between the pleated element and the resilient frame cannot be destroyed and whereby plate 34 always remains in position for supporting element 40 and in turn to be supported by transverse portion 27 of member 25.

In the form of the invention shown in FIG. 5, support member 25 of FIGS. 1-4 is omitted and in lieu thereof two opposite margins 45 of perforated plate 34 are extended axially upwardly substantially the full axial thickness of pleated filter element 40 for imparting rigidity to resilient frame 12 and for locating and laterally supporting pleated element 40. These axially extending sides 45 contain perforations 35 through which resilient material extends to lock the parts together.

In all forms of the invention, the plate 34 and supporting member 25 (when the latter is used) and the wire filter element 40 are held in place in a mold and resilient material is then introduced into the mold to form frame 12. The wire filter element 40 is embedded in the resilient material on all four sides of frame 12 for effectively sealing between the frame and wire filter element. Also, the wire filter element 40 is embedded as at 41 for the full depth of the pleats on two sides of the frame, with the last leg 41 of the pleats entering the resilient material adjacent plate 34 for maximum strength. Thus, fluid passes through the filter in a direction from the wire element 40 toward plate 34 and the latter supports the wire element immediately adjacent the resilient frame 12.

I claim:

1. A filter comprising a frame of resilient material, a support member of rigid material, said frame and member having aligned center openings through which fluid may pass, said member having an axially extending marginal portion embedded within said frame and having a transverse marginal portion connected to the lower end of the axial marginal portion and providing a shelf, and a perforated rigid plate extending across said openings and supported by said shelf, a perforated filter element supported by the upper side of said plate and extending across said openings, said plate and element each having a set of parallel folds, the folds of the plate extending at right angles to the folds of the element and being of less depth than those of the element, the margins of said element also being embedded within said resilient frame, said axially extending portion being perforated and said resilient material extends through said perforations to lock said axially extending portion within said resilient frame, said axially extending portion extending throughout a major portion of the axial length of said frame, and said shelf being spaced from the lower end of the frame, said axial and transverse portions being embedded in all the sides of said frame, adjacent portions of the axial and transverse portions forming corners therebetween, and the plate along all edges of its outer margin extending into the region of said corners whereby the plate is supported by said shelf along each of its outer marginal edges.

2. The filter of claim 1 in which said shelf projects a short distance into the opening of the frame.

* * * * *